United States Patent [19]

Voinche et al.

[11] Patent Number: 4,678,587
[45] Date of Patent: Jul. 7, 1987

[54] WATER DISTILLATION METHOD

[76] Inventors: Jack L. Voinche, P.O. Box 3591, Lafayette, La. 70502; James C. Martien, 1275 Lurose Dr., Crowley, La. 70526

[21] Appl. No.: 679,767

[22] Filed: Dec. 10, 1984

[51] Int. Cl.⁴ .............................................. C02F 1/16
[52] U.S. Cl. ................................... 210/748; 210/774; 203/12; 203/22; 203/DIG. 17
[58] Field of Search ............ 203/12, 22, 24, DIG. 17; 210/771, 773, 774, 748, 717, 750

[56] References Cited

U.S. PATENT DOCUMENTS

| | | | |
|---|---|---|---|
| 3,575,814 | 4/1971 | Bahrenburg | 203/DIG. 17 |
| 3,854,301 | 12/1974 | Cytryn | 203/DIG. 17 |
| 4,035,243 | 7/1977 | Katz et al. | 203/DIG. 17 |

*Primary Examiner*—Tom Wyse
*Attorney, Agent, or Firm*—Keaty & Keaty

[57] ABSTRACT

A method of desalinating water in which a stream of air is saturated with heated water containing dissolved solids and suspended solids. A stream of saturated air is passed through a cooling element to cool saturated air below its dew point, and the water thereby condensed is collected. In preferred embodiments, the cooled air is heated and recirculated through an evaporation screen to saturate the stream of air.

12 Claims, 3 Drawing Figures

WATER DISTILLATION METHOD

BACKGROUND OF THE INVENTION

1. Field of the Invention

This invention concerns a method and apparatus for removing dissolved and suspended solids from water. It is especially directed towards a method of desalinating sea water.

2. Background of the Invention

It is known that air is saturated with water when the partial pressure of water in the air is equal to the vapor pressure at that temperature. If the partial pressure of water exceeds the vapor pressure, the air is said to be super saturated. This situation can occur when the temperature of saturated air decreases. As the temperature decreases, the relative humidity of the saturated air become greater than one-hundred percent and the super saturated air cannot hold this much water. The excess water then condenses. The temperature at which the partial pressure of water equals the vapor pressure is known as the dew point.

The principle of cooling air below its dew point has previously been employed in distilling water. For example, U.S. Pat. Nos. 4,014,751 and 4,344,826 disclose structures in which liquid is evaporated by being heated with a heating element, the evaporated liquid then being passed through a condenser to cool the vapor and collect distillate therefrom. These prior art structures have the advantage of separating water from a dissolved impurity such as salt because the heating elements evaporate only water, thereby leaving dissolved and suspended solids such as salts behind when the water vapor moves to the condenser. These prior art devices, however, require heating water with a heating element in order to evaporate the water before it reaches the cooling element. The heating and evaporating step requires substantial input of energy because of the high specific heat of water.

Since water boils at lower temperatures at lower air pressures, other prior art devices have reduced and the pressure in an evaporator to enhance the production of steam as water is heated. An example of such a method is shown in U.S. Pat. No. 3,725,206. The development and maintenance of even a partial vacuum requires specialized pumps having high energy requirements.

It is an object of the present invention to provide a more efficient method of removing dissolved and suspended solids from water by evaporating the water without applying heat from a heating element.

It is a further object of the invention to avoid the necessity for reducing air pressure to promote evaporation of the water.

It is another object of the invention to provide a compact, portable and efficient apparatus for desalinating water that is capable of being used on offshore structures such as oil platforms.

SUMMARY OF THE INVENTION

The aforementioned objects are achieved by a method for desalinating water in which a stream of air is saturated with the water by flowing the water over an evaporation screen. The saturated stream of air is then passed through a cooling element to condense the water therein, the water then being collected in a collection pan disposed beneath the cooling element. The air which passes through the cooling element is thereafter heated in a heating element and recirculated through the evaporation screen over which water is flowing. In preferred embodiments, the water flowing over the screen is heated before it reaches the screen.

DETAILED DESCRIPTION OF THE PREFERRED EMBODIMENT

Figure 1:
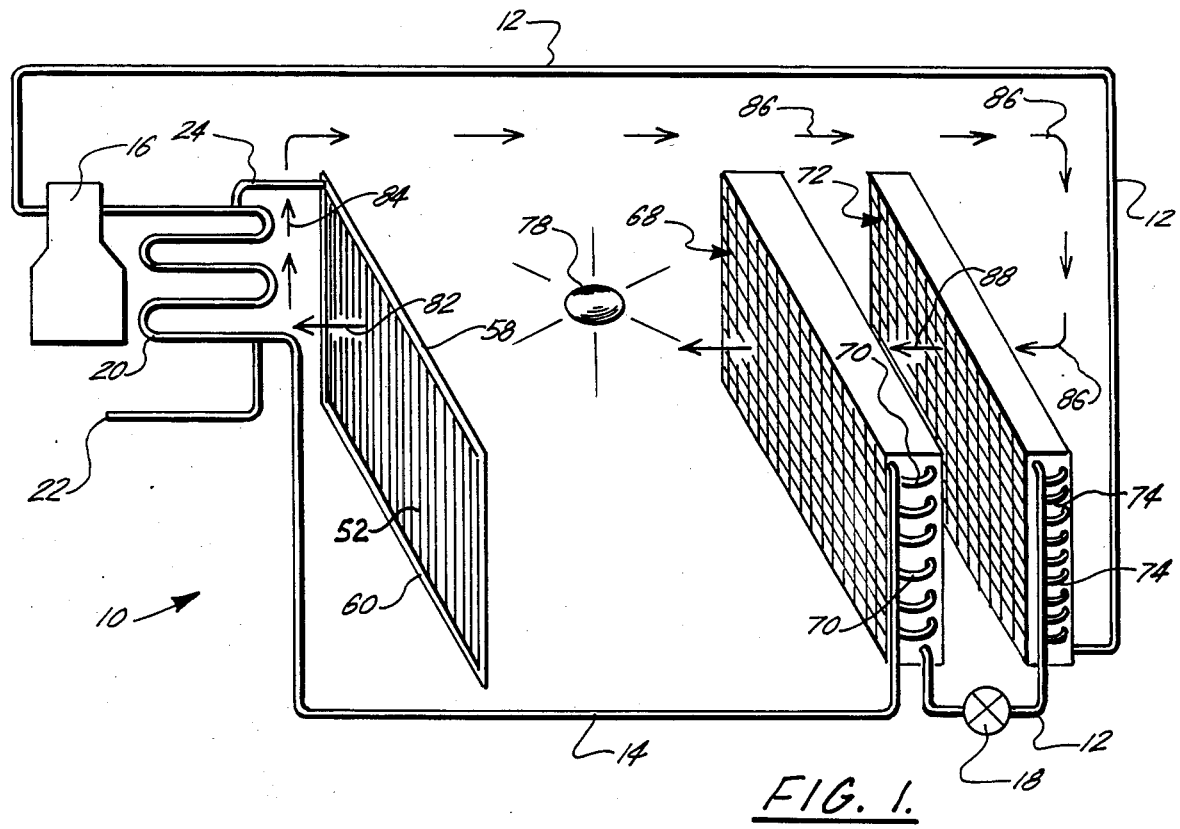
FIG. 1 is a schematic view of the method and apparatus for removing particulate matter from water.
Figure 2:
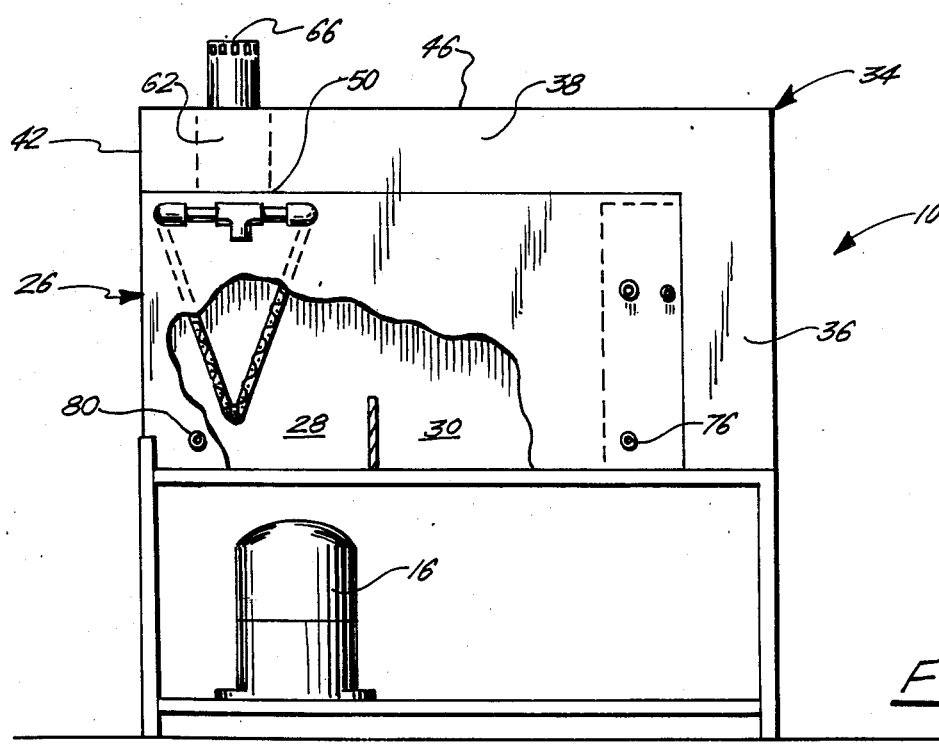
FIG. 2 is a side view of a specific embodiment of the apparatus for desalinating water, portions of a sidewall of the apparatus being cut away for clarity, portions of an evaporation screen and centrifugal blower being shown in phantom.
Figure 3:
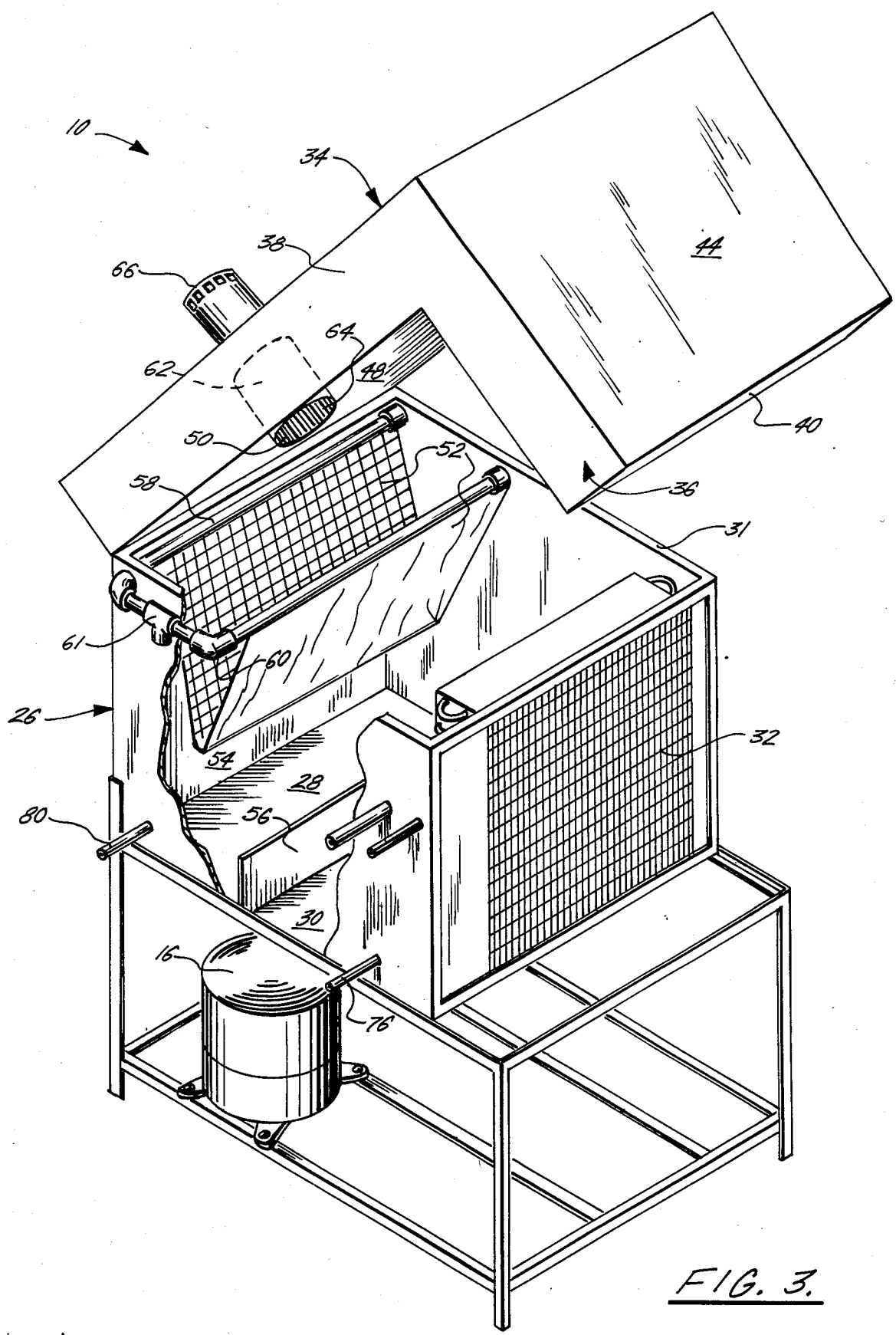
FIG. 3 is a perspective view of the apparatus shown in FIG. 2, an L-shaped air return conduit being pivoted upwardly about a hinge to reveal the interior of the apparatus, portions of a sidewall of the box-like enclosure being cut away for clarity.

Referring now to FIGS. 1–3, an apparatus 10 is shown for removing dissolved and suspended solids such as sodium chloride salt from a raw liquid, such as raw water from the ocean. Apparatus 10 includes a closed loop refrigeration system comprised of a conduit loop through which a refrigerant fluid flows, the system having a cooling portin 12 and a heating portion 14 (FIG. 1). A compressor 16 is disposed in the system between cooling portion 12 and heating portion 14. Compressor 16 is connected to the refrigeration system so that the refrigerant fluid (for example Freon®) flows from cooling portion 12 into compressor 16 and thence into heating portion 14.

An expansion valve 18 (FIG. 1) is disposed between cooling portion 12 and heating portion 14 of the system, valve 18 being in fluid communicating relationship with both portions 12, 14.

A counter current, liquid-liquid heat exchanger 20 is disposed in the heating portion 14 of the refrigeration system, heat exchanger 20 being comprised of a raw water conduit in heat exchanging relationship with the conduit of the heating portion 14 of the system, the exchanger 20 being provided with an inlet 22 for the introduction of raw water and an outlet 24. In order to increase the area of contact between the raw water conduit and the conduit of the heating portion of the system, the system conduit and raw water conduit are arranged in a snake-like series of U-shaped loops.

A rectangular box enclosure 26 has a rectangular base and four upright, rectangular walls. Enclosure 26 contains an air saturation sector 28 and a condensation sector 30 (FIGS. 2 and 3). Enclosure 26 has an open, rectangular top 31 and an open side 32. In the embodiment shown in FIG. 3, side 32 has a pair of vertical slats, one on either side of open side 32, which enclose therebetween a square opening wich can be covered with a filter screen.

An L-shaped air return conduit is generally designated by the numeral 34 in FIGS. 2 and 3, conduit 34 being configured to cover the open top 31 and open side 32 of the enclosure 26. Air return conduit 34 is further comprised of a first, box-like member 36 and a second box-like member 38, the members 36, 38 being perpendicular to one another and having a continuous passageway therethrough. The bottom face 40 of first member 36 is closed, as is the vertical side face 42 of second member 38 (FIG. 2). First member 36 is further comprised of a pair of flat, parallel faces designated outer face 44 and inner face (not shown). Second member 38 is comprised of flat, horizontal, closed outer face 46 and closed inner face 48. First member 36 closes open side 32 of enclosure 26, the open inner face of first member 36 fitting in fluid communicating relationship against the opening in open side 32. Second member 38 is of substantially the same transverse and longitudinal dimensions as the open top of enclosure 26, and fits in closing relationship over the open top 31 of enclosure 26. A circular opening 50 is provided in inner face 48 of second member 38 for establishing fluid communication between the interior of air return conduit 34 and air saturation sector 28 of enclosure 26. Conduit 34 is secured to enclosure 26 with a hinge (not shown) at the intersection of faces 48, 42 to provide pivotal movement of conduit 34 up and away from enclosure 26.

A V-shaped evaporation screen 52 is provided within air saturation sector 28 of enclosure 26, the V of screen 52 opening upwardly and having first and second top edges parallel to the plane of open side 32. Screen 52 is, in preferred embodiments, made of a material over which water freely flows. Examples of suitable material include open cell foam or fiberglass like material used in air conditioner filters. Both of these materials serve the function of greatly increasing the surface area over which the water flows while permitting air to be blown therethrough. The upper edges of evaporation screen 52 enclose opening 50. The width of evaporation screen 52, defined as the distance between the parallel upper edges thereof, is substantially the same as the width of air saturation sector 28, defined as the distance between sidewall 54 and baffle 56. The length of screen 52 is substantially the same as the length of air saturation sector 28. The similar dimensions of the screen 52 and sector 28 permit screen 52 to substantially fill sector 28, at least near the open top 31 of enclosure 26. Screen 52 is suspended from a pair of parallel perforated fluid conduits 58, 60 which span the length of air saturation sector 28 (FIG. 3) and which are mounted in the side walls of enclosure 26 by being placed through cylindrical openings through the side walls. Screen 52 is mounted on conduits 58, 60 by being looped around the conduits. Conduits 58, 60 are in fluid delivering relationship to screen 52, while conduits 58, 60 are also in fluid communicating relationship with outlet 24 (FIG. 1) through manifold 61 (FIG. 3).

A centrifugal blow 62 is rotatably mounted in return conduit 34 around opening 50. Blower 62 is comprised of a pair of parallel rings (not shown) interconnected with a plurality of parallel vanes 64 (FIG. 3) which are perpendicular to the rings. Motor 66 is mounted on top of second member 38 with the shaft of motor 66 projecting through outer face 46 of top member 38. This shaft, which is not shown in the drawings, rotates blower 62 to circulate air from saturation sector 28, through opening 50 and into member 38.

A heating element 68 is shown in FIG. 3 disposed within enclosure 26 between screen 52 and cooling element 72 (described below). Heating element 68 is comprised of a plurality of conduit coils 70 in fluid communicating relationship with the fluid in heating portion 14 of the refrigeration system. The coils 70 of heating element 68 substantially cover a transverse, cross-sectional area of enclosure 26 between screen 52 and cooling element 72.

Cooling element 72 is disposed within enclosure 26 between open side 32 and heating element 68. Cooling element 72 is comprised of conduit coils 74 in fluid communicating relationship with the fluid in the cooling portion 12 of the system, coils 74 substantially covering a transverse, cross-sectional area of enclosure 26 which is parallel and adjacent to open side 32.

Condensation sector 30 serves as a water collection pan beneath cooling element 72. In other embodiments, a smaller water collection pan, which covers the area of sector 30 underneath cooling element 72, can be used. Water collecting conduit 76 conveys water accumulated in the water collection pan from sector 30 to a receptacle for the collection of the distilled water.

Since the water in apparatus 10 is being distilled in a very humid environment, the growth of bacteria may be promoted. In order to diminish the likelihood of such a possibility, an ultraviolet light 78 is provided for illuminating the area between screen 52 and cooling coil 72. In preferred embodiments, ultraviolet light 78 also illuminates the collection area or collection pan beneath cooling coil 72. In especially preferred embodiments, additional ultraviolet lights can be added outside the enclosure adjacent collecting conduit 76.

In operation, the refrigerant fluid (Freon®) in the refrigerant system is compressed by compressor 16 to heat the fluid to approximately 120° F. This fluid is then passed through counter current, liquid-liquid heat exchanger 20 (FIG. 1) to bring the fluid into heat exchanging relationship with sea water introduced through inlet 22. The temperature of water as it enters inlet 22 is typically 75° F., that is, ambient temperature. As the raw sea water passes through the loops of heat exchanger 20 it is heated by the hot, 120° fluid in the system. By the time water emerges from exchanger 20 and enters outlet 24 the temperature of the water is approximately 120°. The now heated salt water flows through perforated conduits 58, 60 and leaves these conduits through the perforations therein. Since conduits 58, 60 are disposed adjacent the top of screen 52, water flows out of conduits 58, 60 and into screen 52. A steady flow of water through screen 52 is thereby created, and after water flows to the bottom of screen 52 it is collected at the bottom of air saturation sector 28 and removed through waste water outlet 80. The heated Freon® fluid in portion 14 of the system then passes through heating element 68 to heat coils 70 of element 68, The Freon® fluid in the system raises the temperature of coils 70 in heating element 68 to approximately 120°.

The hot Freon® fluid in portion 14 of the system then passes to expansion valve 18, where it is expanded. Expansion of a fluid reduces its temperature, so the fluid in the refrigerant system is now cooled. In the preferred embodiment, the fluid in portion 12 of the system is at 40° F. This cooled fluid now moves through coils 74 of cooling element 72 to reduce the temperature of element 72 to approximately 40° F. The fluid then leaves cooling element 72 and is recirculated to compressor 16 where the fluid is once again heated by being compressed.

Centrifugal blower 62 is rotated by supplying electrical energy to motor 66 from an energy source (not shown). As vanes 64 of blower 62 rotate, the air in evaporation sector 28 moves through screen 52 to the interior of blower 62 and thence upwardly into the area enclosed by member 38 of conduit 34. The arrows marked with the numerals 82, 84 schematically designate the path followed by the air as it flows through the screen and into conduit 34. As air passes through screen 54 it is saturatd with water, while any dissolved and suspended solids in the water remain in solution or in the screen 52.

The stream of saturated air 86 passes through cooling element 72 to cool the saturated air to about 40° F., which is below the dew point of the saturated air. The air was heated to approximately 120° F. before being passed through screen 52 in a manner to be described below.

When stream 86 passes through cooling element 72 the water carried by stream 86 condenses. The now unsaturated stream of air 88 passes from cooling element 72 to heating element 68. Stream 88 is heated as it passes through heating element 68, emerging from element 68 at arrow 90 at a temperature of about 120° F. This heated air enters evaporation sector 28 and passes through screen 52, thereby being recycled back towards and centrifugal blower 62. The heated air is thereby recycled and directed through evaporation screen 52. Heating air prior to passing it through screen 52 increases its capability to carry moisture.

As water condenses on cooling element 72, it moves downwardlly under the influence of gravity. The water then accumulates on the bottom of condensation sector 30 or in a collection pan provided for that purpose. The distilled water is collected through collecting conduit 76 and stored until needed.

As the saturated air passes from heating element 68 to evaporation screen 52, it is illuminated by ultraviolet light 78 which destroys bacteria which may otherwise thrive in the humid environment inside enclosure 26. Additional ultraviolet lights positioned, for instance, at conduit 76 serve the same function elsewhere in apparatus 10.

Although a detailed description of the preferred embodiment of the invention has been provided in accordance with law, the invention is at least as broad as the scope of the following claims.

We claim:

1. A method of desalinating water, comprising the steps of:
   providing a closed loop refrigeration system, the system comprising a conduit loop through which a refrigerant fluid flows, the system having a cooling portion and a heating portion, wherein the refrigerant fluid in the system is compressed and supplied to a heating element for heating air, the heating element comprising conduit coils in fluid communicating relationship with the fluid in the heating portion of the system, the fluid moving through the coils of the heating element and thereafter being expanded and passed through a cooling element;
   heating the water;
   flowing the water over an evaporation screen;
   heating a stream of air;
   saturating the stream of air with water by passing the stream of air through the evaporation screen over which the water is flowing;
   passing the stream of saturated air through the cooling element to condense the water therein; and
   collecting the condensed water, wherein air which has passed through the cooling element is heated and passed through the evaporation screen.

2. The method of claim 1, wherein the step of heating the water before flowing it over the screen is performed in a counter current, liquid-liquid heat exchanger disposed in the heating portion of the system, the heat exchanger being comprised of a raw water conduit in heat exchanging relationship with the conduit of the heating portion of the system, the heat exchanger being provided with an inlet for the introduction of raw water and an outlet, a supply of raw water passing through the raw water conduit of the exchanger before it flows over the evaporation screen.

3. The method of claim 2, further comprising means for reducing the bacterial count of the water.

4. The method of claim 3, wherein the step of reducing the bacterial count of the water comprises exposing the water to ultraviolet radiation.

5. The method of claim 4, wherein the water is exposed to ultraviolet radiation by shining an ultraviolet light on the stream of saturated air.

6. A method of removing dissolved and suspended solids from liquid, comprising the steps of:
   providing a closed loop refrigeration system, the system comprising a conduit loop through which a refrigerant fluid flows, the system having a cooling portion and a heating portion, wherein the refrigerant fluid in the system is compressed and supplied to a heating element for heating air, the heating element comprising conduit coils in fluid communicating relationship with the fluid in the heating portion of the system, the fluid moving through the coils of the heating element and thereafter being expanded and passed through a cooling element;
   heating the liquid;
   flowing the liquid over an evaporation screen;
   heating a stream of air;
   saturating the stream of air with liquid by passing the stream of air through the evaporation screen over which the liquid is flowing;
   passing the stream of saturated air through the cooling element to condense the liquid therein; and
   collecting the condensed liquid, wherein air which has passed through the cooling element is heated and passed through the evaporation screen.

7. The method of claim 6, wherein the step of heating the liquid before flowing it over the screen is performed in a counter current, liquid-liquid heat exchanger disposed in the heating portion of the system, the heat exchanger being comprised of a raw liquid conduit in heat exchanging relationship with the conduit of the heating portion of the system, the heat exchanger being provided with an inlet for the introduction of raw liquid and an outlet, a supply of raw liquid containing dissolved suspended solids passing through the raw liquid conduit of the exchanger before it flows over the evaporation screen.

8. The method of claim 7, further comprising means for reducing the bacterial count of the liquid.

9. The method of claim 8, wherein the step of reducing the bacterial count of the liquid comprises exposing the liquid to ultraviolet radiation.

10. The method of claim 9. wherein the liquid is exposed to ultraviolet radiation by shining an ultraviolet light on the stream of saturated air.

11. A method removing dissolved and suspended solids from water, comprising the steps of:
    providing a closed loop refrigerant system, the system being comprised of a conduit loop through which a refrigerant fluid flows, the system having a cooling portion and a heating portion;
    compressing the fluid to heat it;
    providing a counter-current, liquid-liquid heat exchanger in the heating portion of the system, heat exchanger being comprised of a raw water conduit in heat exchanging relationship with the conduit of the heating portion of the system, the heat exchanger being provided with an inlet for the introduction of raw water and an outlet;

passing the heated fluid through the conduit of the heating portion of the system and passing a supply of raw water which contains particulate matter through the raw water conduit, thereby heating the supply of raw water;

passing the heated fluid through a heating element to heat the heating element, the heating element being comprised of conduit coils in fluid communicating relationship with the fluid in the heating portion of the system;

flowing the heated raw water over an evaporation screen;

passing a stream of heated air through the evaporation screen to saturate the air;

expanding the refrigerant in the refrigerant system to cool it and passing the expanded fluid through a cooling element to cool the cooling element, the cooling element being comprised of conduit coils in fluid communicating relationship with the cooling portion of the system;

passing the stream of saturated air through the cooling element to cool the saturated air to a temperature below the dew point of the saturated air and condense the water carried by the air, then passing the air from which the water has been condensed through the heating element to warm it, and then returning the heated air to the evaporation screen to pass the heated air through the screen; and collecting the condensed water.

12. The method of claim 11, further comprising exposing the saturated air to ultraviolet radiation as it passes from the evaporation screen to the cooling coil.

* * * * *